Dec. 15, 1964 R. J. ROWEKAMP 3,161,193
POOL-TYPE SOLAR HEAT AND ENERGY COLLECTOR
Filed June 24, 1963

INVENTOR.
RICHARD J. ROWEKAMP
BY Pearce and Schaeper Klaus

Attorneys 3,161,193
POOL-TYPE SOLAR HEAT AND ENERGY
COLLECTOR
Richard J. Rowekamp, Springfield Township, Hamilton County, Ohio (440 Hilltop Lane, Cincinnati, Ohio)
Filed June 24, 1963, Ser. No. 289,988
2 Claims. (Cl. 126—271)

This invention relates to a solar collector or device for accumulating heat and energy from the sun. More particularly, this invention relates to a pool or tray having a transparent panel exposed to the sun for accumulating heat therein.

An object of this invention is to provide a pool or tray adapted to hold water or the like beneath a transparent panel with the panel facing toward the sun so that heat energy from the sun is accumulated to heat the water.

Another object of this invention is to provide a pool of this type having an interior darkened or blackened surface to provide maximum absorption of the sun's heat energy in the water contained in the pan.

Another object of this invention is to provide a waterproof interior surface over a lightweight insulating concrete by applying three thin layers of finely powdered grey-iron castings mixed with ammonia and water to cause quick oxidation, and with the fourth and final layer containing fine particles of coal dust or the like held together by a cement binder. Lightweight insulating concrete is specified, but other structural insulating material with long durability would be satisfactory.

The above and other objects and features of the invention will be apparent to those skilled in the art to which this invention pertains from the following detailed description and the drawing, in which.

In the following detailed description, and the drawing, like reference characters indicate like parts.

Figure 1:
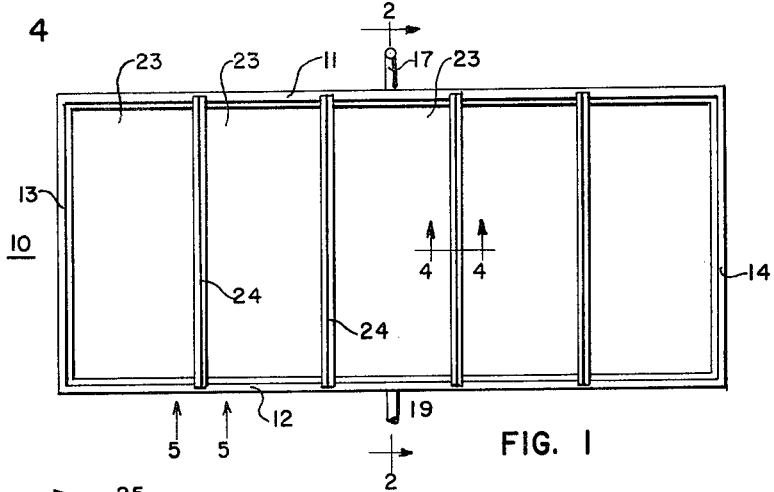
FIG. 1 is a schematic plan view showing a pool for accumulating solar heat and energy constructed in accordance with an embodiment of this invention.
Figure 2:
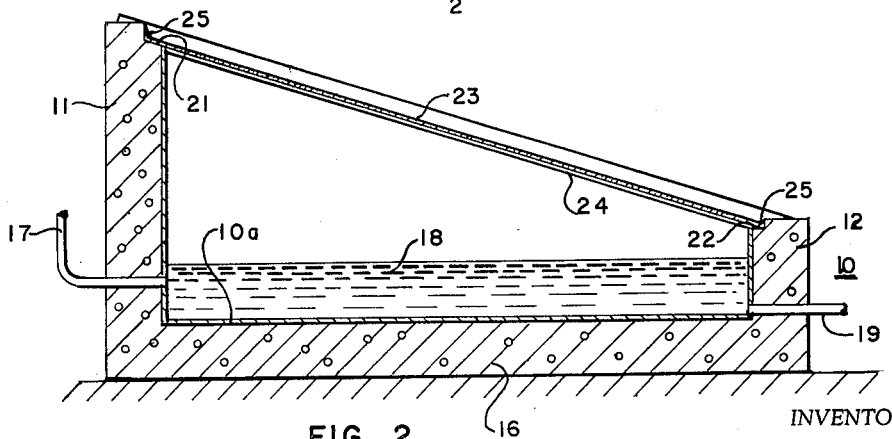
FIG. 2 is an enlarged view in section taken on the line 2—2 in FIG. 1.

In FIGS. 1 and 2 is shown a pool or pan 10 having rear and front walls 11 and 12, end walls 13 and 14 (FIG. 1) and a base 16 (FIG. 2), all of which are formed of lightweight insulating concrete or the like and are integrally formed. The front wall 12, as shown in FIG. 2, is of lesser height than the rear wall 11. The base 16 rests upon the ground or the like.

An inlet line 17 permits entry of water 18 into the interior of the pool 10. A discharge line 19 permits removal of heated water therefrom.

As already indicated, the pool is formed of lightweight insulating concrete, which is composed of a mixture of one part Portland cement and four (to eight) parts of lightweight aggregates, such as the material known as Perlite, which is a volcanic rock expanded by heating to form a lightweight non-combustible glass-like material honeycombed with cells. The interior faces 10a of the pool are made waterproof by applying three coatings of a mixture of finely powdered grey-iron castings and ammonia and water; a fourth and final coating consists of fine particles of coal dust and Portland cement, to provide a black or dark interior face on the pool.

Figure 6:
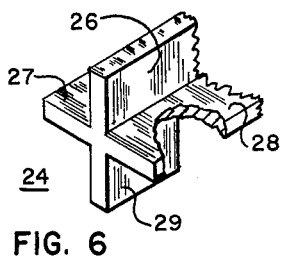
FIG. 6 is a fragmentary perspective view showing an end portion of one of the mullions, a portion being broken away to reveal interior construction.
Figure 4:
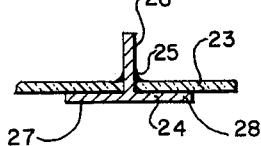
FIG. 4 is a view in section taken on the line 4—4 in FIG. 1.
Figures 5, 7:
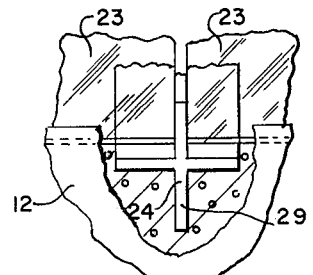
FIG. 5 is a fragmentary view in end elevation taken in the direction of the arrows 5—5 in FIG. 1 partly broken away and in section to reveal interior construction.
FIG. 7 is a fragmentary enlarged plan view showing the mounting of an end portion of one of the mullions together with associated portions of the device.
Figure 3:
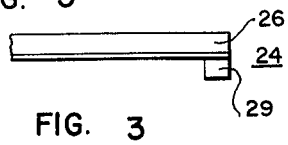
FIG. 3 is a fragmentary enlarged view in side elevation showing a portion of a glass supporting mullion.

As shown in FIG. 2, inner edges of rear, front, and end walls are provided with shoulders 21 and 22, respectively, for receiving upper and lower edges of panes of glass 23. Adjacent edges of panes of glass 23 are supported by mullions 24. The glass panes are held in place by a glazing compound 25 such as a polysulphide resin polymer or the like. Each of the mullions 24 extends from the rear wall 11 to the front wall 12 with ends thereof being received in slots in the walls to be supported thereby. The slots can be formed by placing the mullions in the concrete at the time of pouring. As shown in FIG. 4, each of the mullions is of generally inverted T-shape in cross-section and includes an upwardly extending arm 26 and a cross bar portion including outwardly extending arms 27 and 28. As shown in FIGS. 3, 5, and 6, at opposite ends of each mullion, are provided downwardly extending flanges 29 which extend into the concrete of the walls, as shown most clearly in FIG. 5, to anchor the mullions against turning. As shown in FIG. 7, edges of the panes of glass 23 rest on the outwardly extending arms 27 and 28 of the mullions to be supported thereby.

The pool is mounted with the sheets of glass 23 sloping downwardly toward the south if in the Northern Hemisphere (toward the north if in the Southern Hemisphere) so that heat from the sun can be accumulated in water held in the pool.

Water is introduced into the pool 10 through the inlet line 17 and is permitted to remain in the pool until the water has been raised in temperature, as desired, by action of the sun. Then, heated water can be withdrawn through the outlet line 19. The heated water can be used in generating mechanical or electrical energy in accordance with the method pointed out in my copending application Serial No. 192,390, filed May 4, 1962, or can be used for other purposes for which heated water is required.

The pool-type solar heat and energy accumulating device illustrated in the drawing and described above, is subject to structural modification without departing from the spirit and scope of the appended claims.

Having described my invention, what I claim as new and desire to secure by Letters Patent, is:

1. A heat accumulator for collecting solar energy in a liquid which comprises a pool having a base and walls extending upwardly from said base, transparent sheet means spanning the walls, said base and walls being formed of lightweight insulating concrete, an interior coating thereon comprising an inner layer of fine powdered grey-iron castings mixed with ammonia and water and an outer layer comprising finely divided coal dust and Portland cement to provide a dark inner face, means for introducing liquid into the pool to be heated by the sun and means for removing heated liquid from the pool.

2. A solar collector for storing solar energy in water, which comprises a piece of structural insulating material formed in the shape of a pool having a base and walls extending upwardly from the base, waterproofing material on its interior surface, a glass cover mounted on the upper portion of the pool, and means for filling and emptying the pool; said collector having an interior coating comprising an inner layer of fine powdered grey-iron castings mixed with water and ammonia and an outer layer comprising finely divided coal dust and Portland cement; said glass cover being supported by shoulders on the inner portion of the walls and by inverted T-shaped mullions anchored in the walls.

References Cited by the Examiner

UNITED STATES PATENTS

| | | | |
|---|---|---|---|
| 2,872,915 | 2/59 | Bowen | 126—271 |
| 2,383,234 | 8/45 | Barnes | 126—271 X |
| 3,104,210 | 9/63 | Mount | 126—271 X |

FOREIGN PATENTS

| | | |
|---|---|---|
| 28,130 | 1907 | Great Britain. |

JAMES W. WESTHAVER, *Primary Examiner.*